United States Patent
Gao et al.

(10) Patent No.: US 10,645,497 B1
(45) Date of Patent: May 5, 2020

(54) SURFACE TREATMENTS FOR SILICONE ACOUSTIC DIAPHRAGMS

(71) Applicant: Bose Corporation, Framingham, MA (US)

(72) Inventors: Kai Gao, Marlborough, MA (US); Shawn Prevoir, Northborough, MA (US); Alexander Irwin, Belmont, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/423,838

(22) Filed: May 28, 2019

(51) Int. Cl.
  *H04R 9/02* (2006.01)
  *H04R 31/00* (2006.01)
  *H04R 7/16* (2006.01)
  *H04R 9/06* (2006.01)

(52) U.S. Cl.
  CPC .............. *H04R 9/02* (2013.01); *H04R 7/16* (2013.01); *H04R 9/06* (2013.01); *H04R 31/003* (2013.01); *H04R 2307/025* (2013.01)

(58) Field of Classification Search
  CPC ... H04R 9/02; H04R 7/16; H04R 9/06; H04R 31/003; H04R 2307/025
  USPC ........................................................ 381/398
  See application file for complete search history.

(56) References Cited

U.S. PATENT DOCUMENTS

| 6,473,512 | B1 * | 10/2002 | Juneau | C07D 493/10 381/322 |
| 8,600,096 | B2 | 12/2013 | Lin | |
| 8,718,313 | B2 * | 5/2014 | Keady | H04R 17/00 381/380 |
| 2007/0057602 | A1 * | 3/2007 | Song | H04R 19/04 310/328 |
| 2007/0127746 | A1 * | 6/2007 | Matsuzawa | H04R 19/02 381/191 |
| 2007/0154036 | A1 * | 7/2007 | Matsuzawa | H04R 1/403 381/116 |
| 2013/0076162 | A1 * | 3/2013 | Papakyriacou | B06B 1/045 310/25 |
| 2018/0160231 | A1 | 6/2018 | Bushko et al. | |
| 2019/0037330 | A1 * | 1/2019 | Prevoir | B29C 66/742 |

OTHER PUBLICATIONS

Vig, UV/Ozone Cleaning of Surfaces, J. Vac. Sci. Technol. A 3 (3), May/Jun. 1985, pp. 1027-1034.

* cited by examiner

*Primary Examiner* — Sean H Nguyen
(74) *Attorney, Agent, or Firm* — Bond, Schoeneck & King, PLLC

(57) ABSTRACT

A method of treating a silicone component for an electro-acoustic driver, the method including: forming a body of an elastomeric material having a polymeric backbone, where a portion of the polymeric backbone includes alternating silicon and oxygen atoms without carbon atoms, the body having a front surface and a back surface where the front surface and the back surface have a first level of surface tack; and forming an outermost layer on or within at least one part of the front surface or the back surface, the outermost layer having a second level of surface tack that is less than the first level of surface tack. The outermost layer includes a permanent silicone coating applied on the front or back surface or an altered surface chemistry within the front or back surface generated using ultraviolent/ozone treatment.

20 Claims, 7 Drawing Sheets

— 100

S100 — Forming a body comprising an elastomeric material having a polymeric backbone, wherein a portion of the polymeric backbone includes alternating silicon and oxygen atoms without carbon atoms, the body having a front surface and a back surface where the front surface and the back surface have a first coefficient of friction S110 — Forming an outermost layer on or within at least one part of the front surface of the back surface, the outermost layer having a second coefficient of friction that is less than the first coefficient of friction

US 10,645,497 B1

SURFACE TREATMENTS FOR SILICONE ACOUSTIC DIAPHRAGMS

BACKGROUND

This disclosure relates to surface treatments for silicone acoustic diaphragms to reduce surface tack and debris accumulation.

Components that are made of soft materials, such as rubber, can have a tacky surface that can disrupt manufacturing processes and/or affect the functionality of these components. For example, electro-acoustic drivers (e.g., microspeakers that can be used in miniature earbuds) have a compliant diaphragm made of very soft liquid silicone rubber (LSR) to achieve the desired acoustic performance. During assembly, the tacky surface of the diaphragm made of liquid silicone rubber can collect dust or dirt from the air, and the collected dust or dirt can alter the acoustic property of the component and/or affect the aesthetics of the component. Additionally, the tacky surface of the diaphragm may stick to parts and fixtures during assembly underneath and in operation, i.e., a bobbin, and tear if not released carefully.

Conventional methods for reducing surface tack involve application of one or more anti-sticking powders. However, such powders can cause dusting which is problematic.

Accordingly, there is a need in the art for inexpensive, efficient, and effective methods for treating surfaces of silicone components to reduce surface tack with minimal impact on acoustic performance and without producing any mess.

SUMMARY

All examples and features mentioned below can be combined in any technically possible way.

In one aspect, a method of treating a silicone component for an electro-acoustic driver is provided. The method includes forming a body of an elastomeric material having a polymeric backbone, where a portion of the polymeric backbone includes alternating silicon and oxygen atoms without carbon atoms, the body having a front surface and a back surface where the front surface and the back surface have a first level of surface tack. The method further includes forming an outermost layer on or within at least one part of the front surface or the back surface, the outermost layer having a second level of surface tack that is less than the first level of surface tack.

Implementations may include one or more of the following. The step of forming the outermost layer can include oxidizing at least one part of the front surface or the back surface to incorporate at least one functional group on the polymeric backbone of the elastomeric material. The at least one functional group can consist of a hydroxyl diol, a carboxylic acid, a ketone, and/or an aldehyde on the polymeric backbone. In another implementation, the step of forming the outermost layer comprises generating $SiO_2$ on or within at least one part of the front surface or the back surface.

The step of forming the outermost layer can include generating surface oxidation using ultraviolet/ozone treatment. The ultraviolet/ozone treatment can include an ultraviolet light source emitting energy at two different wavelengths.

In some implementations, the step of forming the outermost layer includes altering the surface chemistry of the outermost layer within the front surface or the back surface.

In other implementations, the step of forming the outermost layer includes forming a permanent coating of silicone on top of the body.

In another aspect, a diaphragm for an electro-acoustic driver is provided where a body of an elastomeric material having a polymeric backbone is included. A portion of the polymeric backbone includes alternating silicon and oxygen atoms without carbon atoms. The body has a front surface and a back surface where the front surface and the back surface have a first level of surface tack. An outermost layer on or within at least one part of the front surface or the back surface has a second level of surface tack that is less than the first level of surface tack.

Implementations may include one or more of the following. The outermost layer can include a permanent coating made of silicone on top of the body. The permanent coating can be uniformly distributed on the front surface and the back surface. The outermost layer can include a top-most layer within the front surface or the back surface. The outermost layer can include at least one functional group incorporated on the polymeric backbone via surface oxidation. The surface oxidation can be generated using ultraviolet/ozone treatment. The at least one functional group can consist of a hydroxyl diol, a carboxylic acid, a ketone, and/or an aldehyde on the polymeric backbone. The outermost layer can comprise $SiO_2$ on or within at least one part of the front surface or the back surface.

In a further aspect, an electro-acoustic driver is provided. The electro-acoustic driver includes a housing having an opening at both ends; a bobbin arranged within the housing, the bobbin having an opening at both ends; and a diaphragm secured to the bobbin and the housing, the diaphragm formed of an elastomeric material having a polymeric backbone. A portion of the polymeric backbone includes alternating silicon and oxygen atoms without carbon atoms, and the diaphragm includes a front surface and a back surface having a first level of surface tack. An outermost layer on or within at least one part of the front surface or the back surface has a second level of surface tack that is less than the first level of surface tack.

Implementations may include one or more of the following. The outermost layer can include a permanent coating made of silicone on top of the front surface or the back surface. The outermost layer can include a top-most layer within the front surface or the back surface. The outermost layer can include at least one functional group incorporated on the polymeric backbone via surface oxidation or $SiO_2$.

Other features and advantages will be apparent from the description and the claims.

DETAILED DESCRIPTION

While silicone components are commonly used for wearable devices because they are biocompatible, soft and resilient, such components tend to have a high coefficient of friction, which causes them to collect dust or dirt or stick to itself or other components. The rubber diaphragm can also stick to other components (e.g., a bobbin) within the driver and tear easily. Dusting agents, such as talc, mica, clay and calcium carbonate, have been used historically to prevent rubbers from sticking together. Metallic stearates have also been used as anti-tack materials historically. Unfortunately, these anti-tack materials cause dusting, snowing, and foaming, which are hazardous and messy. The surface treatments described herein reduce the surface tack of materials made of silicone while avoiding the hazards and mess associated with conventional anti-tack materials. The surface treatments described herein also reduce the surface tack without significantly impacting the acoustic properties of the material.

The embodiments and implementations disclosed or otherwise envisioned herein can be utilized with any modern in-ear headphones, or earbuds, including microspeakers having an elastomeric component made of silicone, for example. However, the disclosure is not limited to these enumerated devices, and thus the disclosure and embodiments disclosed herein can encompass any device including one or more silicone components.

Figure 1A:
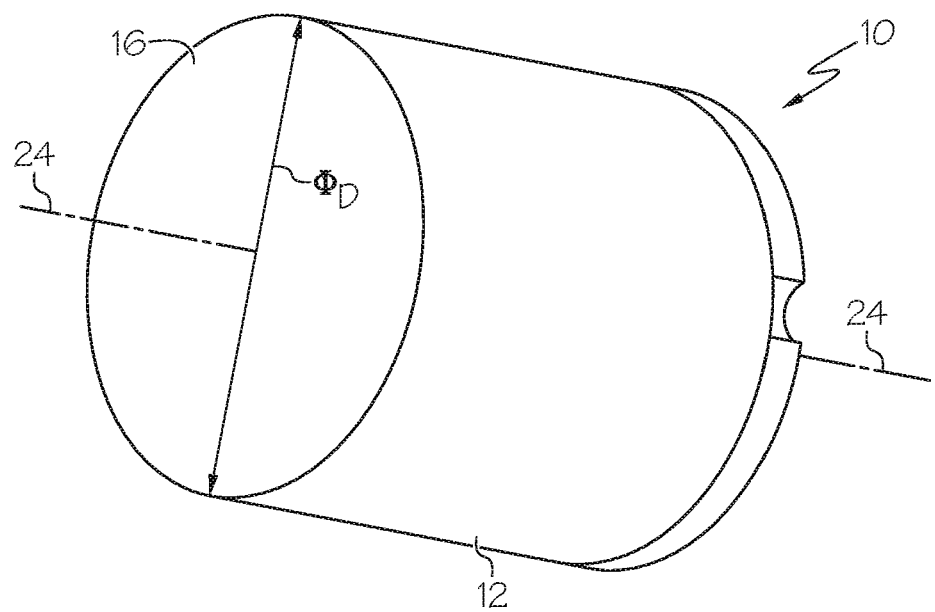
FIG. 1A is an example perspective view of an electro-acoustic driver.
Figure 1B:
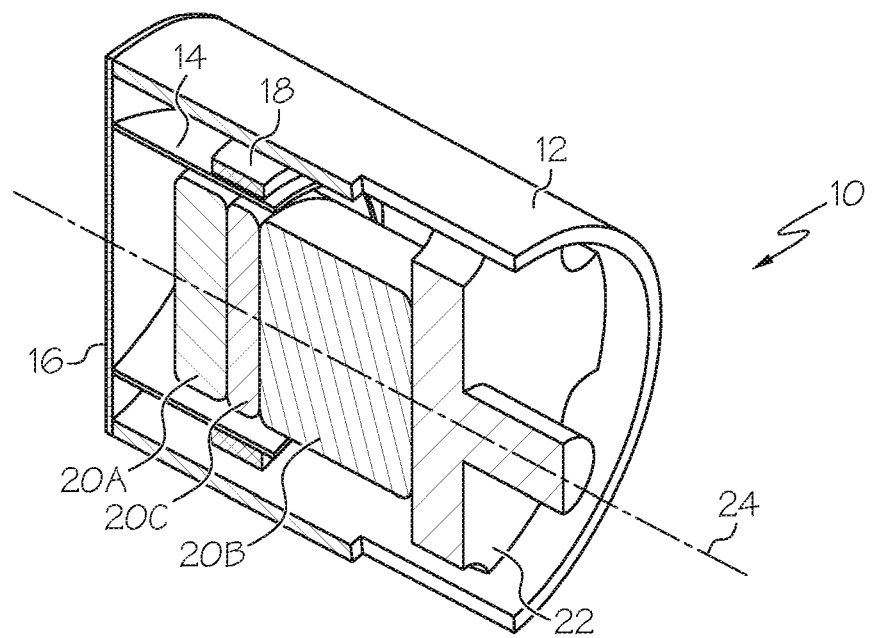
FIG. 1B is an example cutaway view of an electro-acoustic driver.
Figure 1C:
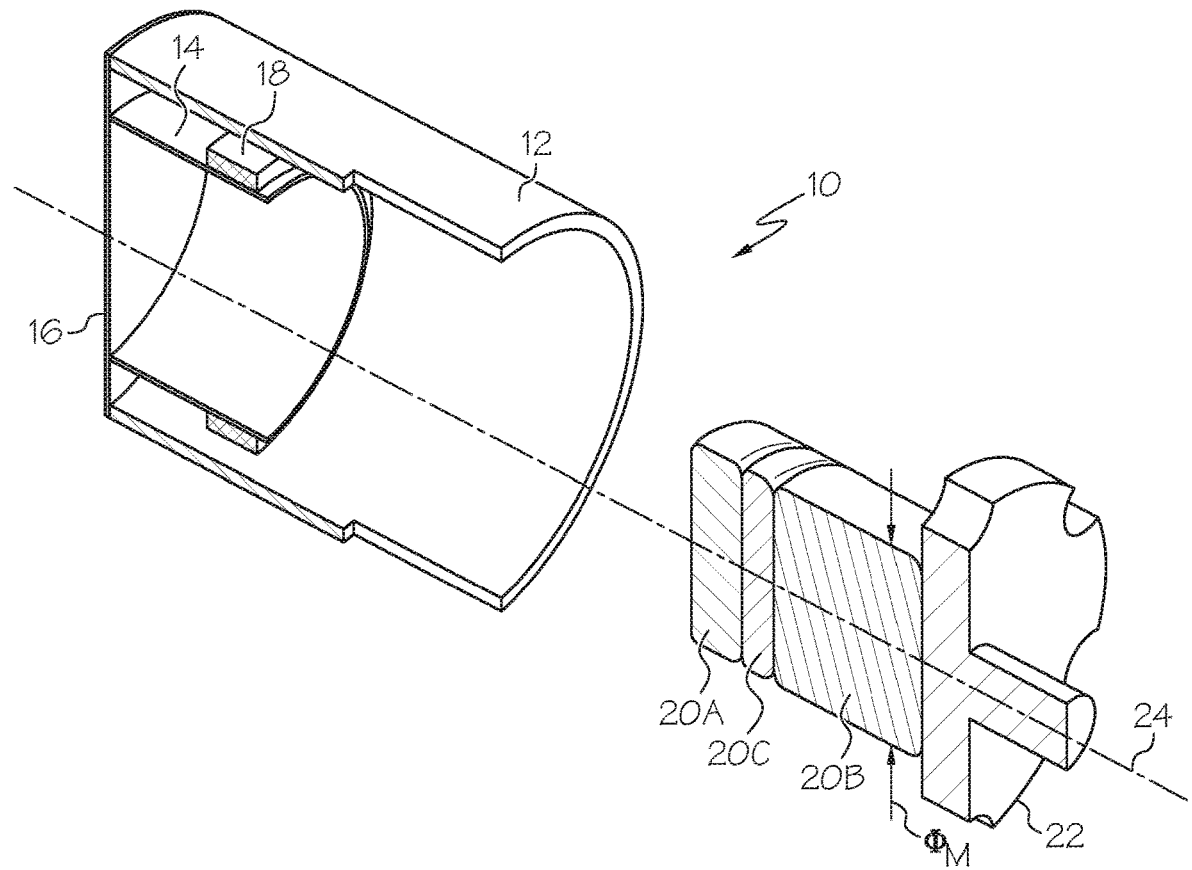
FIG. 1C is an example partially exploded cutaway view of the electro-acoustic driver of FIG. 1B.

Referring to FIGS. 1A, 1B, and 1C, an example electro-acoustic driver 10 (e.g., a microspeaker) that can be used in a miniature earbud is shown. The electro-acoustic driver 10 includes a housing 12 that can be cylindrical and include an opening at both ends. A bobbin 14 can be included inside the housing 12 and the bobbin 14 can be cylindrical in shape and include an opening at both ends. The housing 12 can be made of stainless steel and the bobbin 14 can be made of a polyimide (e.g., KAPTON®) or polyethylene terephthalate (PET) (e.g., MYLAR®). The housing 12 and bobbin 14 can be secured at one of their open ends to a diaphragm, or membrane, 16 formed of a compliant material, such as, an elastomer. The electro-acoustic driver 10 can also include a coil assembly 18 wound onto an outside surface of the bobbin 14. The coil assembly 18 can include a winding of an electrical conductor. The electro-acoustic driver 10 can also include a magnet assembly 20 secured to a platform at an end of the housing 12 that is opposite to the diaphragm 16. The magnet assembly 20 can include magnet pieces 20A and 20B that can be, for example, neodymium magnets, and an intervening coin 20C. The magnet assembly 20 extends along a housing axis 24 (i.e., a cylinder axis) and into an open region inside the bobbin 14. The axis of the bobbin 14 can be substantially co-axial with the housing axis 24. The outer diameter of the housing 12 can be approximately less than 8 mm, and in some embodiments, approximately between 3.0 mm and 4.5 mm. The diameter of the diaphragm $\phi_D$ can be approximately less than 4.7 mm. The magnet pieces 20A, 20B, and 20C can have a diameter $\phi_M$ that is approximately between 1.5 mm and 4.5 mm. The radiating area is approximately equal to the area of an inner region of the diaphragm 16.

Figure 2:
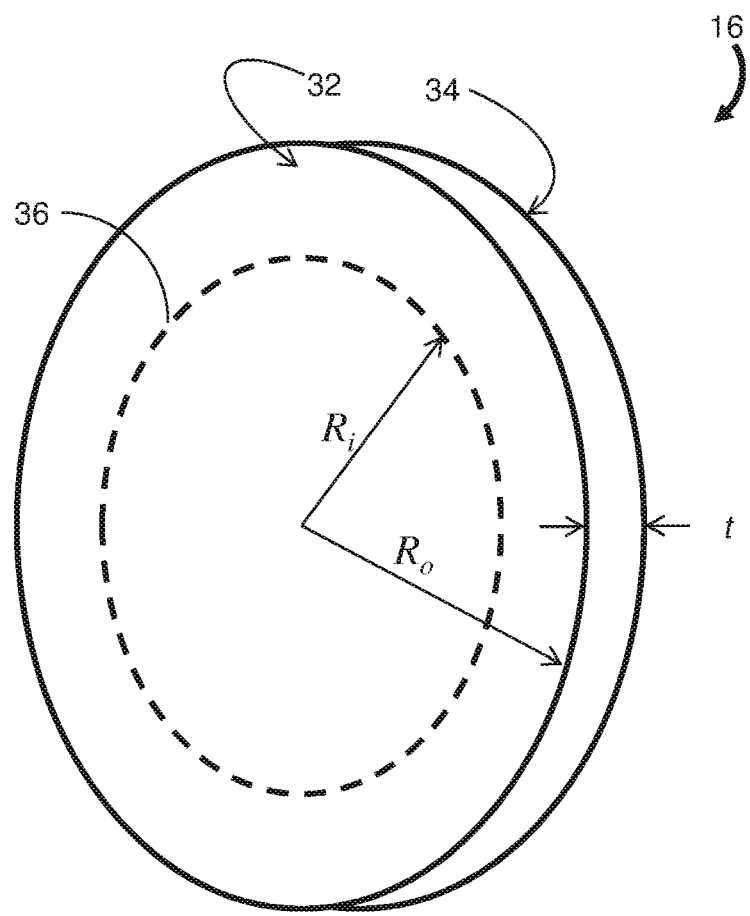
FIG. 2 is an example perspective view of the diaphragm of FIGS. 1A to 1C.

The compliant material used to form the diaphragm 16 is generally tacky and has a high coefficient of friction, which can cause the diaphragm 16 to collect dust or dirt from the air during assembly. Such debris can alter the acoustic properties of the diaphragm when in use. The tackiness of the diaphragm 16 may also cause the diaphragm to stick to the bobbin 14 and tear if not released carefully. With reference to FIG. 2, the diaphragm 16 can be formed of a liquid silicone rubber that can be cured to provide the desired thickness t, which can be approximately a few tens of microns to more than 100 μm. The diaphragm 16 includes a front surface 32, a back surface 34, and an inner region within the dashed circular line 36 of radius $R_i$ that is approximately equal to the outer diameter of the bobbin 14. The outer radius $R_o$ is approximately equal to the outer diameter of the housing 12.

When assembled and in use, the bobbin 14 moves substantially along its axis and the housing axis 24 in response to an electrical current conducted through the winding of the coil assembly 18. This motion causes the inner region of the diaphragm 16 to move axially and displace air to thereby generate an acoustic signal. The diaphragm 16 has a substantially planar shape when at rest, that is, when no electrical signal is applied to the winding of the coil assembly 18 to generate sound. When the microspeaker 10 is driven by an electrical signal to cause a motion of the bobbin 14 along the housing axis 24, the compliant nature of the diaphragm 16 results in its deformation.

Although the diaphragm 16 can be made of any suitable compliant material, one suitable material is liquid silicone rubber (e.g., ELASTOSIL® LR 3070/OO-20 AB material available from Wacker Chemie AG of Munich, Germany). Generally, any suitable polymeric organosilicon compound or silicone, also known as Poly(dimethyl)siloxane (PDMS), is suitable. The ELASTOSIL liquid silicone rubber has a hardness of around 20 Shore OO durometer, for example and exhibits the desired acoustic performance for the electro-acoustic driver 10.

One technique for fabricating the diaphragm 16 includes placing an open end of the housing 12 and an open end of the bobbin 14 into a single thin layer of liquid silicone. The liquid silicone is then cured to form the diaphragm 16. The central region of the diaphragm 16 can be stiffened while the annular region that surrounds the central region remains compliant. The methods described herein focus on altering surface chemistries occurring on the outer sub-micron level of the material to lower the coefficient of friction without impacting the bulk properties. The methods described herein also focus on applying a very thin coating to the surface of the material to lower the coefficient of friction without significantly impacting the acoustic performance of the material.

Figure 3:
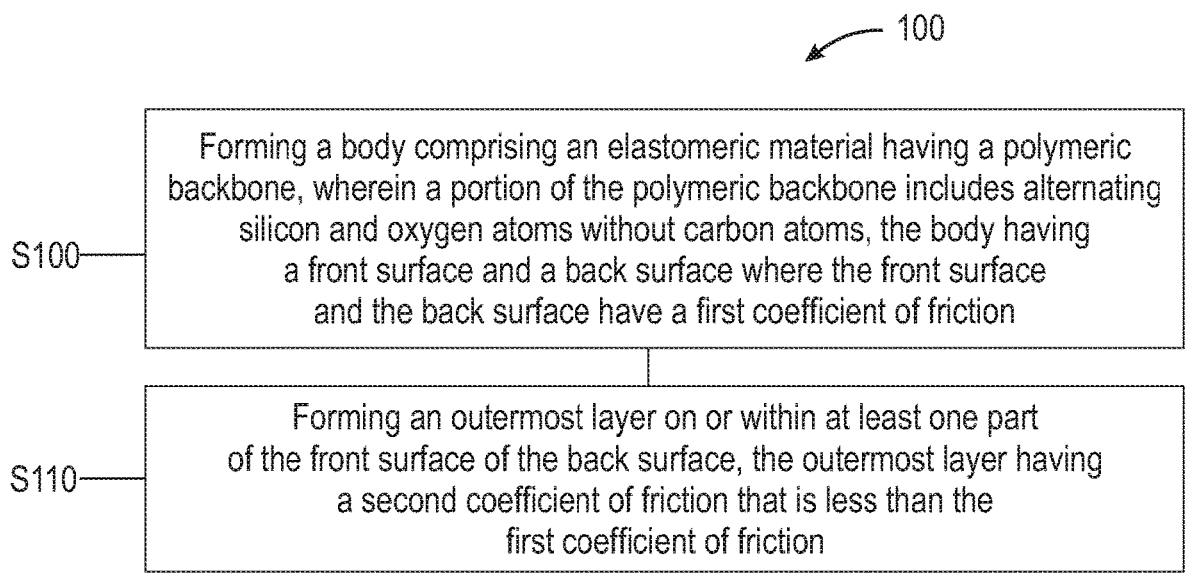
FIG. 3 is a flowchart of an example method of treating a silicone component of an electro-acoustic driver to reduce surface tack.
Figure 4:
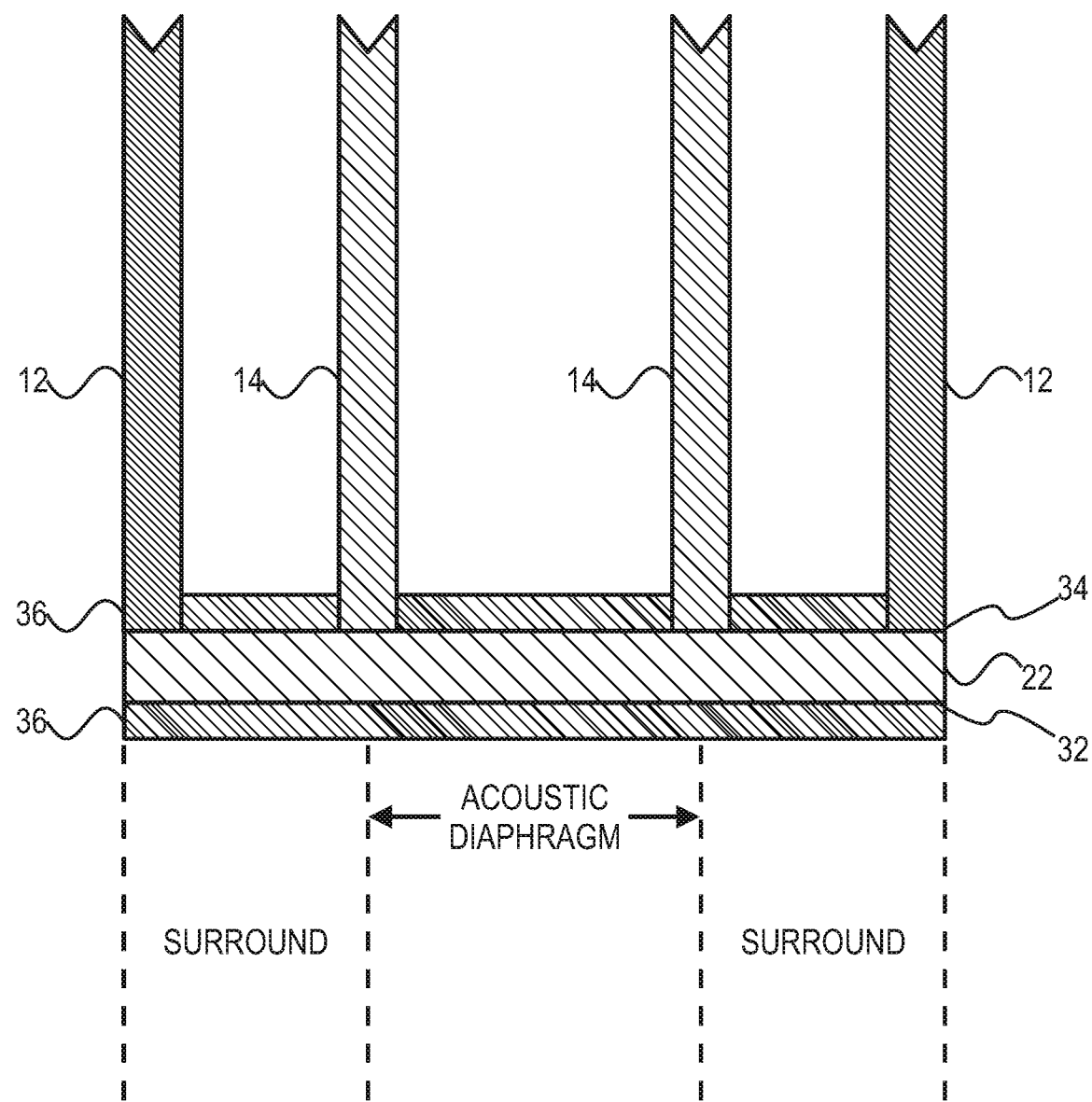
FIG. 4 is a schematic representation of a diaphragm of an electro-acoustic driver including a permanent coating.
Figure 5:
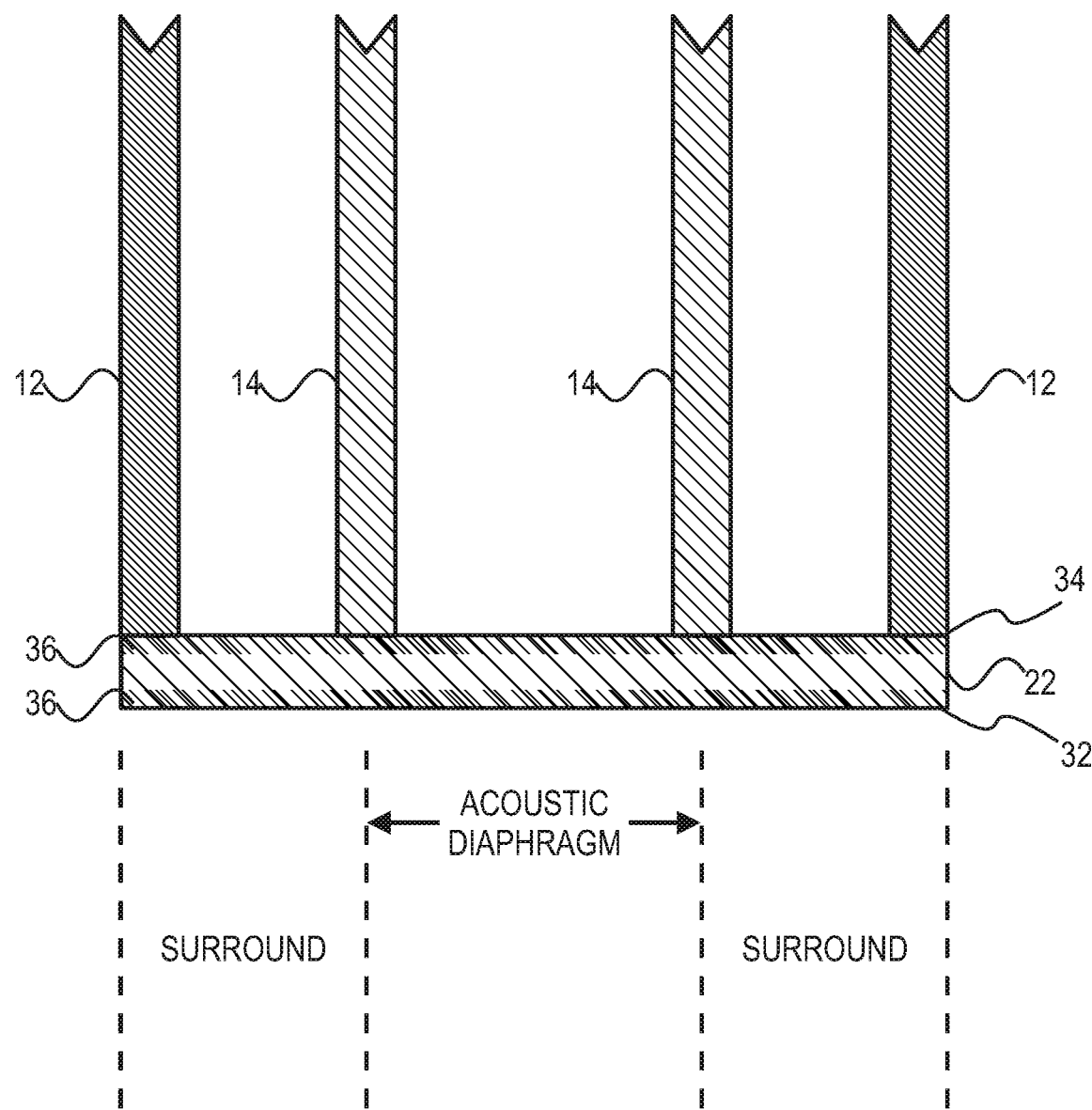
FIG. 5 is a schematic representation of a diaphragm of an electro-acoustic driver including surface oxidation.

FIG. 3 is a flowchart representation of an example method 100 of treating a silicone component for an electro-acoustic driver. According to the method, at step S100 a diaphragm 16 is formed where the diaphragm is made of an elastomeric material having a polymeric backbone. The diaphragm can be formed by creating one or more elastomeric layers 22 (as shown in FIGS. 4 and 5), which are at least partially cured. The term "partially cured" means that a skin coat is formed on top of an elastomeric layer to a degree that the elastomeric material in that layer will not flow or mix with a new layer of liquid elastomeric material deposited on the partially cured layer. The elastomeric material can be a liquid silicone rubber (e.g., ELASTOSIL® LR 3070/00-20) which includes a polymeric backbone that includes alternating silicon and oxygen atoms without carbon atoms. The formation of the diaphragm 16 can also include curing the liquid silicone rubber using a platinum catalyst in a 150° C. environment for approximately 45 minutes. Optionally, the step of creating one or more elastomeric layers can be repeated to form a multi-layer membrane by depositing one or more additional layers of a liquid elastomeric material and then partially or fully curing each of these layers before applying an additional layer.

The diaphragm 16 includes a front surface 32 and a back surface 34 having a first coefficient of friction. As described herein, the material used to form diaphragm 16 is selected based on the desired acoustic properties for the electro-acoustic driver. However, such materials tend to have a high coefficient of friction. Accordingly, front surface 32 and back surface 34 have a first high coefficient of friction.

To lower the coefficient of friction of front surface 32 and/or back surface 34, the method continues at step S110 by forming an outermost layer 36 on or within at least a part of the front surface 32 and/or the back surface 34. As shown in FIG. 4, an outermost layer 36 can be formed as a permanent coating on top of front surface 32 and/or back surface 34. By using an appropriate silicone, this coating can be bonded to the substrate permanently. For example, silicone coatings can bond with silicone substrates due to their compatibility in chemistry. The coatings can be applied with the aid of thin solvents during the standard spraying or dipping process. Example suitable coatings include, but are not limited to, Product Name X-93-1710-1 available from Shin-Etsu Silicones of America, Inc. of Akron, Ohio and Product Name HCD-25371 available from Momentive Performance Materials Inc. of Waterford, N.Y.

The outermost layer 36 can be formed on back surface 34 with or without front surface 32 depending on the application. Similarly, the outermost layer 36 can be formed on front surface 32 with or without back surface 34 depending on the application. Although FIG. 4 shows the outermost layer 36 formed uniformly on top of front surface 32, the outermost layer 36 can be formed on any part of front surface 32 and/or back surface 34 and does not necessarily include the entirety of either surface.

As shown in FIG. 5, an outermost layer 36 can also be formed within the outermost nanometer layers (<20 nm) of the front surface 32 and the back surface 34. In other words, the outermost layer 36 can be integral within the front surface 32 and the back surface 34 as opposed to resting on top of the surfaces as shown in FIG. 4. For example, the outermost layer 36 can be generated using ultraviolet/ozone (UV/O) treatment, which creates surface oxidation within front surface 32 and back surface 34. The surface oxidation that is created with UV/O treatment can also be accompanied by the generation of $SiO_2$ on or within the surface of the front surface 32 and/or the back surface 34. The UV/O treatment can be conducted in any suitable gas chamber including oxygen. Generally, such chambers include UV lamp stations that emit multiple wavelengths. Such chambers can be filled with atmospheric air or oxygen. For example, the atmospheric oxygen in such chambers can be irradiated with UV rays having a wavelength of 184.9 nm to form ozone ($O_3$). Ozone decomposes through irradiation with UV rays having a wavelength of 253.7 nm. Atomic oxygen is generated during these processes. Although the embodiments and implementations disclosed or otherwise envisioned herein include UV lamps, any suitable source of light may be employed, such as, mercury lights, electric arcs, sunlight, lasers tuned to a suitable wavelength, flash tubes, etc., instead.

To achieve a reduced tackiness, the electro-acoustic drivers or diaphragms 16 can be exposed to the UV/O treatment for at least 4 minutes, and preferably at least 5-10 minutes at ambient temperature. Prolonged treating time and elevated temperature show increased surface chemistry change. Effective surface oxidation using the UV/O treatment is observed at 50 degrees Celsius, and even further surface oxidation is observed at 100 and 150 degrees Celsius. There is minimal impact on the surface chemistry from using different oxygen flow rates.

Advantageously, the UV/O treatment alters the surface chemistry of the top-most nanometer layer (<20 nm) of the front surface 32 and/or the back surface 34 without changing the overall acoustic property of the diaphragm 16.

Other implementations are within the scope of the following claims and other claims to which the applicant may be entitled.

What is claimed is:

1. A method of treating a silicone component for an electro-acoustic driver, the method comprising:
   forming a body comprising an elastomeric material having a polymeric backbone, wherein a portion of the polymeric backbone includes alternating silicon and oxygen atoms without carbon atoms, the body having a front surface and a back surface where the front surface and the back surface have a first level of surface tack; and
   forming an outermost layer on or within at least one part of the front surface or the back surface, the outermost layer having a second level of surface tack that is less than the first level of surface tack.

2. The method of claim 1, wherein the step of forming the outermost layer comprises oxidizing at least one part of the front surface or the back surface to incorporate at least one functional group on the polymeric backbone of the elastomeric material.

3. The method of claim 2, wherein the at least one functional group consists of a hydroxyl diol, a carboxylic acid, a ketone, and/or an aldehyde on the polymeric backbone.

4. The method of claim 1, wherein the step of forming the outermost layer comprises generating $SiO_2$ on or within at least one part of the front surface or the back surface.

5. The method of claim 1, wherein the step of forming the outermost layer comprises generating surface oxidation using ultraviolet/ozone treatment.

6. The method of claim 5, wherein the ultraviolet/ozone treatment comprises an ultraviolet light source emitting energy at two different wavelengths.

7. The method of claim 1, wherein the step of forming the outermost layer comprises forming a permanent coating comprising silicone on top of the body.

8. The method of claim 1, wherein the step of forming the outermost layer comprises altering the surface chemistry of the outermost layer within the front surface or the back surface.

9. A diaphragm for an electro-acoustic driver, comprising:
   a body comprising an elastomeric material having a polymeric backbone, wherein a portion of the polymeric backbone includes alternating silicon and oxygen atoms without carbon atoms, the body having a front surface and a back surface where the front surface and the back surface have a first level of surface tack; and
   an outermost layer on or within at least one part of the front surface or the back surface, the outermost layer having a second level of surface tack that is less than the first level of surface tack.

10. The diaphragm of claim 9, wherein the outermost layer comprises a permanent coating made of silicone on top of the body.

11. The diaphragm of claim 10, wherein the permanent coating is uniformly distributed on the front surface and the back surface.

12. The diaphragm of claim 9, wherein the outermost layer comprises a top-most layer within the front surface or the back surface.

13. The diaphragm of claim 9, wherein the outermost layer comprises at least one functional group incorporated on the polymeric backbone via surface oxidation.

14. The diaphragm of claim 13, wherein the at least one functional group consists of a hydroxyl diol, a carboxylic acid, a ketone, and/or an aldehyde on the polymeric backbone.

15. The diaphragm of claim 13, wherein the outermost layer comprises $SiO_2$ on or within at least one part of the front surface or the back surface.

16. The diaphragm of claim 13, wherein the surface oxidation is generated using ultraviolet/ozone treatment.

17. An electro-acoustic driver, comprising:
a housing having an opening at both ends;
a bobbin arranged within the housing, the bobbin having an opening at both ends;
a diaphragm secured to the bobbin and the housing, the diaphragm formed of an elastomeric material having a polymeric backbone, wherein a portion of the polymeric backbone includes alternating silicon and oxygen atoms without carbon atoms, and wherein the diaphragm comprises a front surface and a back surface having a first level of surface tack; and
an outermost layer on or within at least one part of the front surface or the back surface, the outermost layer having a second level of surface tack that is less than the first level of surface tack.

18. The electro-acoustic driver of claim 17, wherein the outermost layer comprises a permanent coating made of silicone on top of the front surface or the back surface.

19. The electro-acoustic driver of claim 17, wherein the outermost layer comprises a top-most layer within the front surface or the back surface.

20. The electro-acoustic driver of claim 19, wherein the outermost layer comprises at least one functional group incorporated on the polymeric backbone via surface oxidation or $SiO_2$.

* * * * *